United States Patent [19]

Andersson et al.

[11] Patent Number: 4,805,951
[45] Date of Patent: Feb. 21, 1989

[54] GRIPPING MECHANISM

[75] Inventors: Rolf J. Andersson; Chajkiel Pajes; Kjell Höglund; Tore Nilsson, all of Västerås, Sweden; Ragnar Husebye, Trondheim, Norway; Sigbjørn Høyland, Hommersåk, Norway; Hans Lindland, Sandnes, Norway; Tore Mong, Randaberg, Norway; Erling Nesse, Straumsgrend, Norway

[73] Assignee: AB Asea-Atom, Västerås, Sweden

[21] Appl. No.: 111,282

[22] Filed: Oct. 22, 1987

[30] Foreign Application Priority Data

Oct. 22, 1986 [SE] Sweden ............... 8604505

[51] Int. Cl.$^4$ ............... B25J 15/10; B66C 1/66
[52] U.S. Cl. ............... 294/116; 294/82.32
[58] Field of Search ............... 294/82.32, 88, 100, 294/115, 116; 279/37–39, 107, 108; 901/31, 36–39, 41

[56] References Cited

U.S. PATENT DOCUMENTS

| 509,310 | 11/1893 | Heberling | 294/116 X |
| 687,165 | 11/1901 | Quinby | 294/115 |
| 941,558 | 11/1909 | Cloak | 294/115 |
| 2,280,422 | 4/1942 | Harcos | 294/115 X |
| 4,036,353 | 7/1977 | Suter | 294/116 X |

FOREIGN PATENT DOCUMENTS

| 526664 | 6/1957 | Italy | 294/82.32 |
| 26055 | 3/1978 | Japan | 294/116 |
| 1203005 | 1/1986 | U.S.S.R. | 294/82.32 |

Primary Examiner—Johnny D. Cherry
Attorney, Agent, or Firm—Watson, Cole, Grindle & Watson

[57] ABSTRACT

A gripping mechanism for gripping a retraction cone attached to a workpiece includes an outer shroud formed of an outer tubular part and an outer funnel-shaped part; a gripping device which is axially movable within the outer shroud, the gripping device including a tubular sleeve which has wings axially movable with axial slots in the outer tubular part and a plurality of finger elements with hook-shaped ends attached to the wings; an operating device which includes an independently rotatable sleeve threadingly engaged in the tubular sleeve and an inner funnel which is attached to the outer funnel-shaped part and which includes control slots for the finger elements; and a motor for rotating the rotatable sleeve so as to either axially move the tubular sleeve within the outer shroud such that the finger elements move towards the retraction cone for gripping the retraction cone or, after having gripped the retraction cone, in an opposite direction to position the retraction cone within the inner funnel.

2 Claims, 1 Drawing Sheet

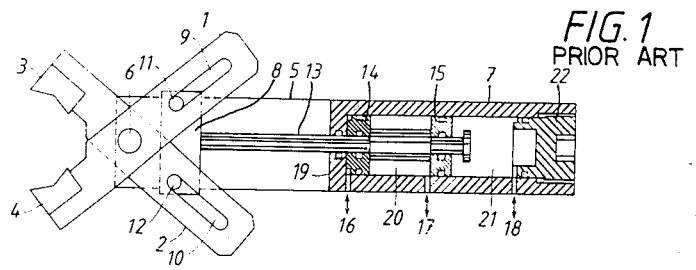
FIG. 1 PRIOR ART
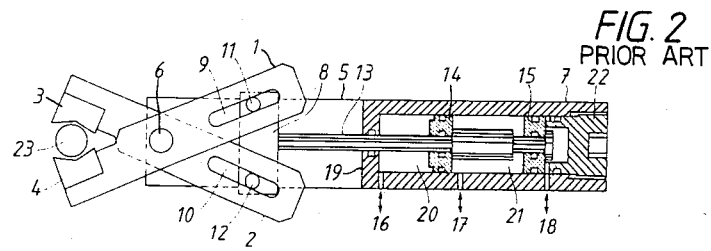
FIG. 2 PRIOR ART
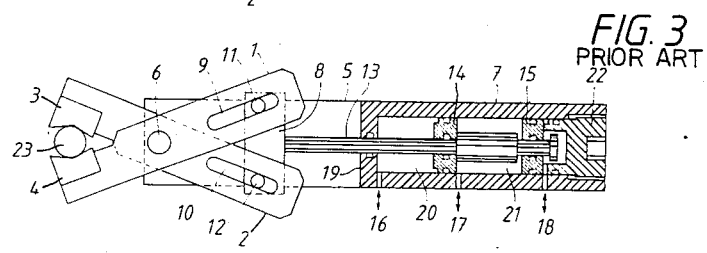
FIG. 3 PRIOR ART
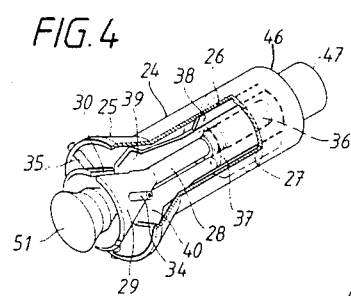
FIG. 4
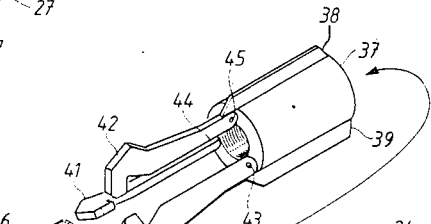
FIG. 6
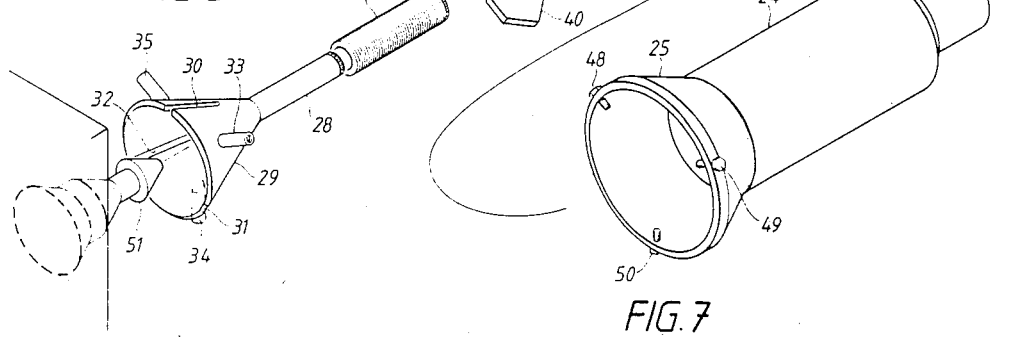
FIG. 5
FIG. 7

GRIPPING MECHANISM

TECHNICAL FIELD

The present invention relates to a retracting, aligning and fixing device with a special embodiment of guide means and gripping means included therein. Such devices have a plurality of fields of application, primarily within the engineering industry, for positionng and fixing tools, measuring apparatus, etc. In addition to the possibility of using the present invention within the pure engineering industry, it is primarily intended for retracting, aligning and fixing tools, etc., in subsea production systems for gas and oil.

BRIEF DESCRIPTION OF THE DRAWINGS

FIGS. 1, 2 and 3 show various stages of movement of a prior art gripping device;

FIG. 4 shows a perspective view of a device according to the invention, a portion of the outer tubular part thereof being broken away; and FIGS. 5, 6 and 7 show perspective views of the different parts of the inventive device.

PRIOR ART

Retracting, aligning, and fixing devices exist in a variety of different embodiments. Their design is normally determined by and adapted to special working machines such as different machine tools, multi-operation machines, robots, manipulators, etc., and is also determined by and adapted to the nature of the objects to be gripped, fixed, etc. However, characteristic of the different embodiments is that they have some form of guiding, gripping and fixing device.

One example of a known embodiment will be given based on Swedish Pat. No. 407 170 (corresponding to British Pat. No. 2,041,263). This shows a gripping device which is supported by a transport arm and is intended to be used in a machine tool. The actual gripping device is of the "tongs type" having two crossed gripping arms with jaws adapted to a workpiece and with a yoke coupled to the arms, which yoke, upon a rectilinear motion, effects a swinging movement of the arms so that the jaws will close around the workpiece.

FIG. 1 shows such a gripping device in an open position, inserted into the machine tool. The crossed arms 1 and 2 with the jaws 3 and 4 are journalled on a shaft pivot 6 located on a plate 5. Associated with the gripping device are an operating cylinder 7 and a yoke 8 displaceable by the operating cylinder 7 and guided by the plate 5. Upon axial movement of the yoke 8, a turning of the gripping arms 1 and 2 is effected by means of the slots 9 and 10 in the arms and the pivots 11 and 12 on the yoke 8. The operating cylinder 7 has a specially formed piston rod 13 which is urged by two movable pistons 14 and 15 via the flow inlets and outlets 16, 17 and 18 into and out of the spaces 19, 20 and 21 in the operating cylinder 7.

The situation shown in FIG. 1 is obtained by the spaces 19 and 20 communicating, via a guide valve (not shown), with a collecting vessel (not shown) and by the space 21 communicating with a pressure medium source (not shown).

FIG. 2 shows a situation in which the space 21 has been put in communication with the collecting vessel and the spaces 19 and 20 have been put in communication with the pressure medium source. This causes the piston rod 13 and the yoke 8 to move to the right in the figure, the arms 1 and 2 thus being rotated about the pivot 6. By axially adjusting the plug 22 (which is screwed to the end of the operating cylinder 7), the movement of the arms 1 and 2 can be adjusted so that the jaws 3 and 4 practically grip a workpiece 23.

The gripping of the workpiece 23 is clear from FIG. 3. This is accomplished by putting the space 20 in communication with the collecting vessel, the piston rod 13 being displaced further to the right and the jaws 3 and 4 gripping the workpiece 23.

A gripping device like the one described above has its limitations. Two of the degrees of freedom in space are determined by where the gripping device is placed with the aid of the transport arm. If there are requirements for a retracting, aligning and fixing device which comprises all three degrees of freedom in space, more sophisticated design solutions are required.

Other and similar gripping structures are described, among other things, in CH No. 553 630 ("Greifwerkzeug"), in U.S. Pat. No. 832,224 ("Grapple"), and in U.S. Pat. No. 2,250,440 ("Oil Well Fishing Tool").

A device according to the invention is capable of covering all three degrees of freedom if an approximate initial position can be achieved.

DISCLOSURE OF THE INVENTION

A retracting, aligning, and fixing device according to the invention consists of a mechanism with a symmetrical finger-like gripper, comprising three or more fingers, which is attached to a sleeve urged by a motor-driven screw. The finger-like gripper is guided by means of wings and slots towards an inner and outer funnel included in the device. Associated with the device is also a retraction cone, towards which funnels, fingers and sleeve are to be guided to effect alignment and fixing. Upon movement of the fingers towards the retraction cone, the finger-like gripper opens so as to create a sufficient gap for it to close around the retraction cone. By reversing the movement of the fingers, there is first obtained a substantially radial movement of the finger-like gripper for gripping and centering behind the retraction cone. Then a substantially axial movement is obtained, whereby the inner funnel included in the device is pulled towards the retraction cone, which, after additional axial finger movement, is urged towards the innermost part of the inner funnel. This results in a precise positioning and fixing of the device with the attached tool, etc.

DESCRIPTION OF THE PREFERRED EMBODIMENT

An embodiment of a device according to the invention will be clear from FIGS. 4, 5, 6 and 7.

FIG. 4 shows a sectional view of the assembled device. As will be clear, it consists of an outer shroud which includes an outer tubular part 24 and an outer funnel-shaped part 25. The inner envelope surface of the outer tubular part 24 is provided with axial guide slots. An embodiment according to FIG. 4 has three guide slots, two of which, 26 and 27, are clear from the sectional view of the outer tubular part 24.

Concentrically in the outer shroud are mounted mechanisms, which are more clearly illustrated in FIGS. 5 and 6. According to FIG. 5 these mechanisms consist of an operating device comprising a shaft 28, an inner funnel 29 attached to one end of the shaft 28 and having three slots 30, 31 and 32, as well as three means of attachment 33, 34 and 35 for attaching the inner funnel 29 to the outer funnel 25. Around the other end of the shaft 28 there is journalled an axially fixed and rotatable sleeve 36 with external threads.

From FIG. 6 it is clear that the concentric mechanism 5 also consists of a gripper device which includes an internally threaded tubular sleeve 37 having three wings axially arranged on an outer surface thereof (two of these wings are shown at 38 and 39 in FIG. 6). The wings are intended to run in the axial guide slots 26, 27 in the outer tubular part 24. To each one of these wings there is attached a finger 40, 41 and 42 with a hook-shaped end, radially movable around the attachment in the respective wing at 43, 44 and 45. The hooks are intended to be guided and controlled in the axial direction by the slots 30, 31 and 32 of the inner funnel 29.

Attached to the end piece 46 of the outer tubular part 24 is a drive means 47 for the threaded sleeve 36.

FIG. 7 also shows the fixing means 48, 49 and 50 for mounting together the two funnels 25 and 29 by means of the attachment devices 33, 34 and 35.

FIG. 5 also shows an embodiment of a retraction cone 51, to which the entire device is intended to be pulled, aligned and fixed. When the operation starts, the threaded tubular sleeve 37 is in its outer axial position relative to the drive means 47. The hook-shaped movable ends of the fingers 40, 41 and 42, attached to the tubular sleeve 37, then rest in the outer end positions of the respective axial slots 30, 31, 32 of the inner funnel 29. The drive means 47 causes the sleeve 36 to rotate. This causes an axial movement to be imparted to the tubular sleeve 37, which axial movement is controlled by the wings 38, 39 running in the axial slots 26, 27 in the outer tubular part 24.

In order for the docking operation to function satisfactorily, the device must have a reasonably correct initial position relative to the workpiece and the retraction cone 51. When the fingers 40, 41, 42 move axially in relation to the funnels 25 and 29, the movable hook-shaped ends of the fingers 40, 41, 42 will come into contact with the retraction cone 51 and, upon continued axial movement, they will slide against the cone 51. Therefore, in addition to an axial movement, also an outward, radial movement will be imparted to the ends of the fingers 40, 41, 42.

This pattern of movement continues until the hooks of the fingers 40, 41, 42 have passed the inner edge of the retraction cone 51 facing the workpiece. The radial outward movement then undergoes a very marked change into an inward radial movement, the hooks of the fingers 40, 41, 42 then closing around the retraction cone 51. When this is done, the direction of rotation of the sleeve 36 is changed via the drive means 47. The result of this is that the entire mechanism is now pulled in towards the retraction cone 51, is aligned relative to the cone, and is finally locked to the cone and the workpiece.

We claim:

1. A mechanism for gripping a retraction cone attached to a workpiece and for aligning the retraction cone with respect to the mechanism and for fixing the retraction cone in position relative to the mechanism, said mechanism comprising:

an outer shroud which includes an outer tubular part and an outer funnel-shaped part, said outer tubular part having an inner wall which includes a plurality of equally circumferentially spaced axial guide slots, a gripper device which is axially movably located within said outer shroud, said gripper device including a tubular sleeve which has a threaded axial bore therethrough and which includes a plurality of equally circumferentially spaced, outwardly-extending wings which respectively fit within said axial guide slots in said tubular part of said outer shroud, and a plurality of finger elements which are respectively pivotally attached to said wings so as to extend within said outer funnel-shaped part of said outer shroud, an operating device which is positioned within said gripper device, said operating device including a central shaft having a first end and a second end, a threaded sleeve attached to said central shaft at the first end thereof, said threaded sleeve being independently rotatable relative to said central shaft and threadingly engaged in said threaded axial bore in said tubular sleeve of said gripper device, an inner funnel connected to the second end of said central shaft and positioned within said outer funnel-shaped part of said outer shroud, said inner funnel including a plurality of equally circumferentially spaced control slots which are respectively aligned with said finger elements of said gripper device, and means connecting said inner funnel to said funnel-shaped part, and a drive means for rotating said threaded sleeve of said operating device, rotation of said threaded sleeve in a first rotation direction causing said tubular sleeve of said gripper device to move within said tubular part in a first axial direction such that said finger elements will move within said control slots towards and into engagement with said retraction cone, and then rotation of said threaded sleeve in an opposite rotation direction causing said tubular sleeve of said gripper element to move within said tubular part in an opposite axial direction such that said finger elements will move within said control slots to position said retraction cone within said inner funnel.

2. A mechanism according to claim 1, wherein said outer tubular part includes three axial guide slots in said inner wall thereof, wherein said tubular sleeve includes three outwardly-extending wings, wherein said gripper device includes three finger elements, and wherein said inner funnel of said operating device includes three control slots therein.

* * * * *